April 1, 1941.  E. G. H. MOBSBY  2,237,193

DETECTION OF OBJECTS BY ELECTROMAGNETIC RAYS

Filed March 31, 1938   2 Sheets-Sheet 1

Inventor
Eric G. H. Mobsby,
By: Smith, Michael & Gardiner, Attys

April 1, 1941.  E. G. H. MOBSBY  2,237,193
DETECTION OF OBJECTS BY ELECTROMAGNETIC RAYS
Filed March 31, 1938  2 Sheets-Sheet 2
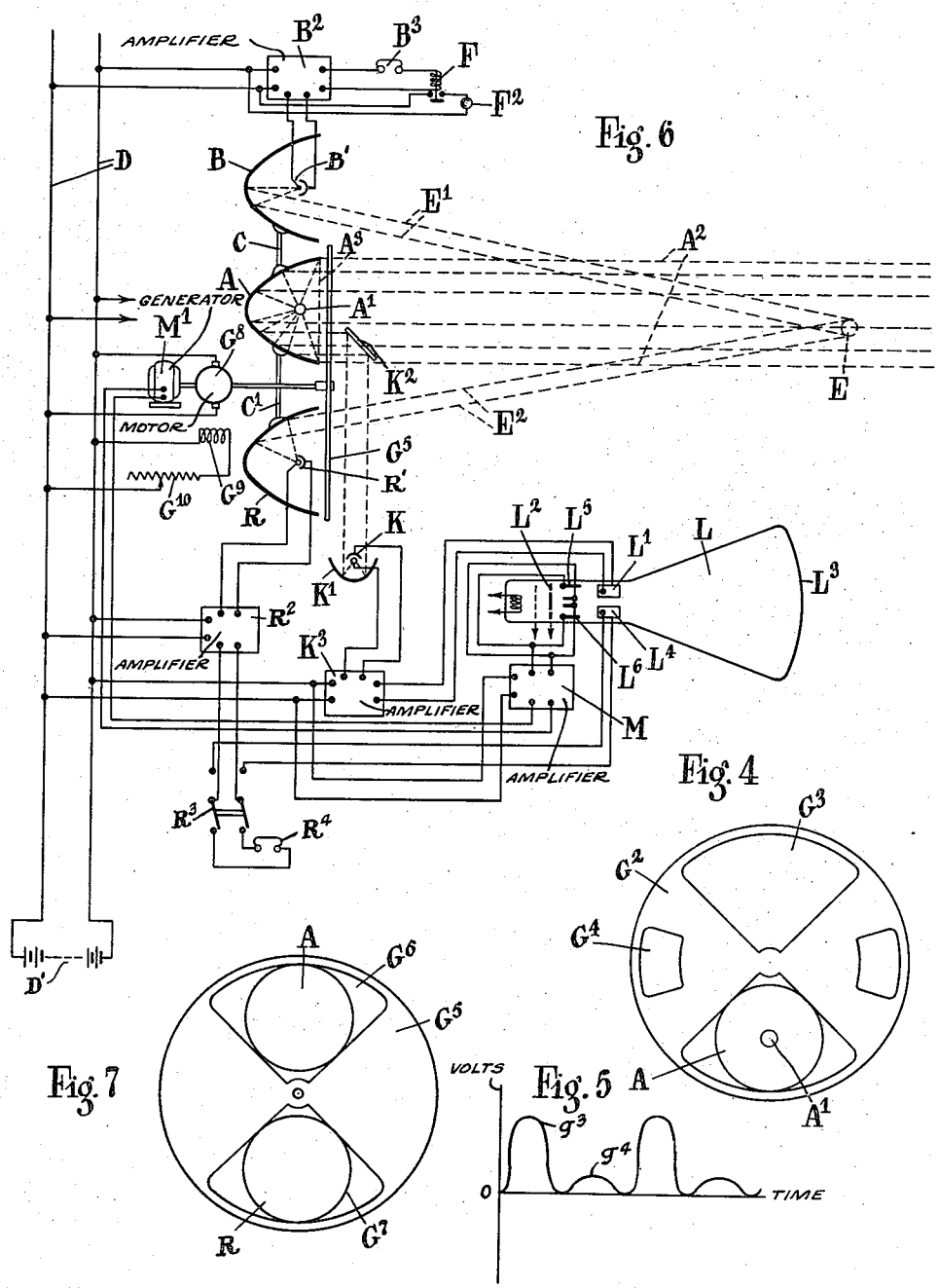
INVENTOR:
Eric G. H. Mobsby,
By: Smith, Michael & Gardiner, Attorneys Patented Apr. 1, 1941

2,237,193

UNITED STATES PATENT OFFICE 2,237,193

DETECTION OF OBJECTS BY ELECTRO-MAGNETIC RAYS

Eric George Herbert Mobsby, London, England, assignor to Ralph Chivas Gully Slazenger, London, England Application March 31, 1938, Serial No. 199,318
In Great Britain April 9, 1937

7 Claims. (Cl. 250—1)

This invention relates to a system and apparatus for detecting by electromagnetic radiation the presence and/or the position of objects, more especially invisible or obscured distant objects.

One object of the invention is to provide a system of detecting the presence and/or determining the position of such objects by very simple means which does not require any great manipulative skill by an operator.

Another object of the invention is to provide a system and apparatus which is compact and portable so that it can readily be transported or mounted on a ship or on a movable vehicle, for example, on an aeroplane and which, moreover, is relatively cheap to manufacture and to maintain.

Yet another object of the invention is to provide an improved system for determining the bearing and distance of an object, for example, for range finding purposes even when such object is obscured by mist or fog, is submerged in water or is invisible owing to darkness.

A further object of the invention is to provide improved means whereby the pilot of an aircraft can readily determine the distance of the aircraft from the ground, for example, when landing during a fog or in the dark.

According to the invention, a system for detecting the presence or the position of objects, especially invisible or obscured objects, comprises a projected beam of electromagnetic rays within the infra-red, visible and ultra-violet wave band, a receiver electrically responsive to such rays reflected from an object in the path of the beam, means for causing the rays falling on the receiver to fluctuate, or to be interrupted intermittently or periodically, and apparatus associated with the receiver for detecting and/or indicating electrical variations produced in the receiver by the fluctuating rays falling thereon.

The electromagnetic rays used in the improved system according to the invention are those rays falling within the wave band of visible and "invisible" light, that is infra-red, visible and ultra-violet rays, having wave lengths of between approximately 800,000 to 200 Angstrom units, and do not include wireless waves. Such rays are spherical and they can be focussed by simple optical means into a relatively narrow beam of predetermined cross-section, for example, of circular cross section. Moreover, since the extent to which the rays penetrate solid bodies is low, as compared, for example, to wireless waves, the amount of reflection is high as is desirable in order to obtain adequate detection of the reflected rays by the receiver. If, for example, the rays falling on the receiver vary periodically at an audio-frequency the electrical output of the receiver can be supplied to earphones and the reception of rays reflected from an object can be readily and immediately detected by a note in the earphones. It will be appreciated that were the beam to be continuous, there would be only a single change in the electrical characteristics or output of the receiver when the reflected rays first fall thereon and a continuous indication of this could not be obtained by simple and reliable means, such as a pair of earphones, which are effectively responsive only to variations in the electric current flowing through them.

The projected beam preferably consists of infra-red rays, that is rays having wave lengths of between approximately 800,000 and 7,700 Angstrom units as they have good penetrative power in fogs or mists, they are invisible and they are readily reflected from solid bodies in the path of the beam.

The fluctuations or interruptions in the rays falling on a receiver may be produced either by varying the intensity of the beam or, by intermittently or periodically interrupting the projected beam or by intermittently or periodically interrupting or deflecting the reflected rays before such rays reach the responsive element in the receiver.

The means for producing fluctuations in the projected beam can be varied widely to suit the nature and size of the projecting apparatus, this size being usually determined mainly by the range required in conjunction with the nature of the rays used and the facilities available for mounting and supplying power to the apparatus. Thus, for example, the intensity of the projected beam may be varied or the beam may be interrupted by a mechanical device, such as a shutter.

In a convenient arrangement, the projector is of the searchlight type and when, as is preferred, the beam is to consist of infra-red rays, the searchlight may be provided with an infra-red filter for removing visible light rays from the projected beam. The beam may be periodically interrupted by a shutter mounted in front of the projector, such shutter being, for example, of the rotating blade type or, in the case of large projectors, of the slat or louvre type with the slats preferably arranged so that they can be rotated to effect rapid opening and closing of the shutter.

The fluctuations can be produced by supplying the source of radiant energy from an alternating or intermittent direct current supply. When, however, the source consists of an electric arc and the frequency of the fluctuations must be such as to produce an audible note, the degree of fluctuation during each alternation constitutes a relatively small percentage of the total radiant energy emission of the arc and accordingly, when the fluctuations are to be produced in this manner it is preferable to use a source, such as a neon discharge tube, without or with little thermal inertia. The fluctuations in the beam can also be produced by focussing the rays emitted from the source so that an image of the source is projected which may be deflected or interrupted by an oscillating mirror or a suitable shutter or other device arranged at or near the focussing point. Alternatively, the desired fluctuations may be produced by the use of a light polarising crystal grid or other polarising device. The fluctuations may also be produced by movement of the energy source itself as, for example, by magnetic deflection of an arc or by actual mechanical movement of the energy source relatively to the focussing point of the projecting system.

The receiver preferably comprises an element responsive to the rays reflected from the object which is to be detected and an optical system for focussing the received rays on to such element. The responsive element preferably consists of a photo-electric cell and when great sensitivity is required a cell of the type employing amplification by secondary emission may be used. Alternatively, the responsive element may consist of a thermally sensitive device, such as a thermocouple of thin wire, which will detect low frequency infra-red rays. If the fluctuations in the received rays are produced at the receiver, the receiver, which may also be constructed in a similar manner to a searchlight, may be provided with a mechanically operated shutter of the rotating blade or slat type arranged either in front of the receiver focussing system or immediately in front of the responsive element. Alternatively, the photo-electric cell or other responsive element may be so mounted that it can be deflected or otherwise moved to a position in which the reflected rays are not focussed thereon.

If desirable or necessary the photo-electric cell in the receiver or the receiver optical system may, when the projected beam consists of infra-red rays, be provided with an infra-red filter in order to reduce the intensity of any background light which, if permitted to reach the cell, would reduce the sensitivity.

The following is a description, by way of example, of several convenient arrangements in accordance with this invention with reference to the accompanying drawings, in which:

Figures 2, 3 and 4 are front views of three suitable forms of shutter.

Figure 5 shows a curve of the wave form obtained with the shutter shown in Figure 4, Figure 6 shows diagrammatically another arrangement and the associated circuits, and Figure 7 is a front view of a shutter for use in the arrangement shown in Figure 6.

Figure 1:
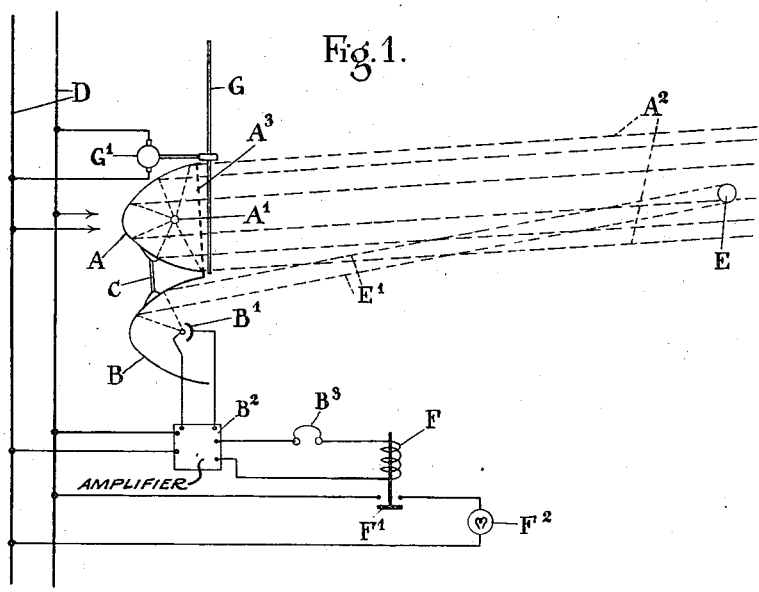
Figure 1 shows diagrammatically one arrangement of apparatus and the associated circuits.

In the arrangement shown in Figure 1, a projected beam of infra-red rays is used. The projector and the receiver each comprise searchlight optical projector systems of normal construction arranged on a common mounting or otherwise mechanically connected so that traversing of the projector causes a corresponding movement of the receiver, this mounting being initially aligned, preferably by projecting visible light, so that rays reflected from an object in the projected beam reach the receiver. In Figure 1, the beam projector is indicated by the reflector A whilst the receiver is indicated by the reflector B, these two reflectors being mechanically connected together as indicated at C. The projector A is provided with a light source $A^1$ disposed at the focus thereof and preferably consisting of a high power carbon arc which is energised from suitable supply mains D connected to a source of electromotive source $D^1$. In order to remove visible light from the projected beam, indicated by the dotted lines $A^2$, the projector A is provided with an infra-red filter diagrammatically indicated at $A^3$.

The receiver, which may be similar in mechanical construction to the projector, has instead of a light source, a photoelectric cell $B^1$ disposed at the focus of the mirror B, this cell preferably being of the gas-filled caesium type. As indicated by the dotted lines $E^1$, reflected rays from an object E in the beam $A^2$ fall on the mirror B and are brought to a focus on the cell $B^1$. The photo-electric cell is connected through a suitable amplifier $B^2$ to earphones $B^3$ and also to a relay F, the contacts $F^1$ of the relay controlling a lamp $F^2$, so that both a visual and an audible signal is obtained. It will be apparent that when only an audible signal is required the relay can be omitted whilst if only a visual signal is required the earphones can be omitted. If desired any other suitable means, such, for example, as a cathode ray oscillograph, can be used to obtain the visual indication whilst if a loud audible signal is required the earphones can be replaced by one or more loud speakers, by an alarm bell or any other suitable device.

Figure 2:
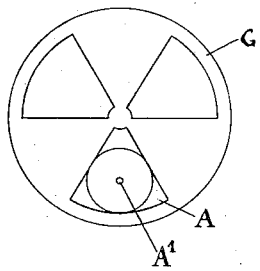

In order to cause the fluctuations in the projected beam, a three-bladed shutter G, which is most clearly shown in Figure 2, is mounted on the projector so that as the shutter is rotated the beam is periodically interrupted. The shutter G may be operated by hand or in any other convenient manner but preferably it is driven by an electric motor $G^1$ energised from the supply mains D. When alternating current supply mains are available, irrespective of whether the arc is supplied with alternating or direct current, the motor $G^1$ is preferably of the synchronous type having a speed such that the beam is interrupted at an audible frequency. Thus, in the case of the three-bladed shutter shown in Figure 2, an audible note having a frequency of 150 cycles is produced in the earphones if the motor $G^1$ is rotated at 3,000 revolutions per minute, this speed being obtained, for example, with a two-pole synchronous motor supplied with 50 cycle alternating current. Since, however, it is only a note which has to be detected in the earphones and the pitch of this note is not important, it is not essential for the shutter to be rotated at a constant speed although it is preferable that the speed should not vary widely.

Figure 3:
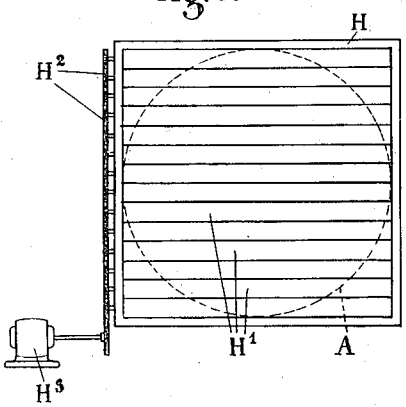

Whilst a shutter, such as is shown in Figure 2, provides a very simple means for interrupting the projected beam, such a shutter becomes unwieldy and difficult to operate at the high speed desirable in the case of the large projectors of, for example, several feet in diameter. With such projectors a shutter, such as is shown in Figure 3, may be provided, this shutter comprising a frame having side members H in which are pivotally mounted thin cross slats $H^1$. With the slats $H^1$ in the positions shown in Figure 3, the beam of the projector is completely obscured whilst when the slats are rotated through 90° they constitute an open grid which does not appreciably obstruct the beam. In order to ensure that the slats $H^1$ are moved simultaneously to open and close the shutter, they are geared together by pinions $H^2$. This shutter, like that shown in Figure 2, can be operated by hand or by any suitable form of motor or prime mover but preferably an electric motor $H^3$ is used as shown in Figure 3.

When a cathode ray tube or other oscillograph is associated with the receiver for obtaining a visual indication of the reflected rays, there is reproduced on the screen of the oscillograph a trace of the wave form of the fluctuations in such rays. When such indicating apparatus is employed the fluctuations can be given a characteristic wave form which will ensure their identification and avoid the confusion of such rays with any other fluctuating rays which may, by chance, reach the receiver. The wave form of the fluctuations may be given its characteristic shape by any convenient means which will depend upon the manner in which the fluctuations are produced. Thus, for example, when a movable shutter is provided at the projector or the receiver, this shutter may be of the form shown in Figure 4. The shutter shown in Figure 4 comprises a disc $G^2$ having a pair of diametrically opposite large apertures $G^3$ each of which enables the projector A to be completely exposed as the aperture passes across it. Symmetrically disposed between the large apertures are two small apertures $G^4$ which only partly expose the beam as they pass across the front of the projector. The resulting characteristic wave form produced on the oscillograph as shown in Figure 5, has large peaks $g^3$ corresponding to the passage of the large apertures $G^3$ across the projector separated by small peaks $g^4$ due to the apertures $G^4$. It will readily be appreciated that when other means are employed for causing the fluctuations, such means can be controlled electrically or mechanically to provide any desired characteristic wave form.

The improved system according to the invention is particularly suitable for detecting not only the presence and the bearing of any distant object which may be obscured by mist or fog or submerged in water or which is invisible owing to darkness but it also constitutes a simple method of ascertaining the range of a distant object in addition to its bearing.

It will be appreciated that in an arrangement such as is described above, the intensity of the note given in the earphones, or the magnitude of the deflection of an indicating instrument, provides an indication which is dependent on both the distance of the object from the projecting apparatus and the area of this object relatively to the size of the beam. It will not be possible, however, to differentiate by the note in the earphones between an object which is close to the apparatus but only occupies a small portion of the beam cross-section and an object which is more distant but is of greater area. This, however, does not apply when the object to be detected occupies the whole cross-sectional area of the beam and thus it is possible to use the relatively simple apparatus described above on aircraft for obtaining an indication of the height of the aircraft as, for example, when landing in an aerodrome during foggy or misty conditions or in the dark. In this case the projected beam is directed on to the landing ground and, since the reflection from the ground is substantially spherical irrespective of the angle of inclination of the beam to the ground, the intensity of the reflected rays falling on the receiver provides a measure of the distance of the receiver from the ground.

In such an installation, the detecting apparatus may, as in the arrangement described above, consist of earphones or an indicating lamp but usually it is preferable to employ some form of indicating instrument, since such an instrument can be calibrated directly in terms of the distance of the aircraft from the ground. The arrangement shown in Figure 6, in which parts corresponding to the arrangement shown in Figure 1 are given the same reference letters, has a projector A mechanically connected to a receiver B by means of which rays reflected from an object E in the projected beam can be detected as in the arrangement shown in Figure 1. In addition to the receiver B there is a second receiver R mechanically connected to the projector A by a member $C^1$ and mounted in such a way that a shutter $G^5$ for producing fluctuations in the projected beam $A^2$ also produces fluctuations in the pencil of reflected rays $E^2$ received from the object E. Thus as shown most clearly in Figure 7 the shutter $G^5$ has two apertures $G^6$ and $G^7$ so disposed that as the shutter is rotated the projector A and the receiver R are simultaneously completely exposed as shown in Figure 5 and then progressively screened until they are both completely obscured by the opaque portions of the shutter. The projected beam $A^2$ is thus periodically interrupted in synchronism with periodical interruption of the reflected rays $E^2$ falling on the receiver R. The shutter $G^5$ is driven by an electric motor $G^8$ having a field winding $G^9$ and a field regulator $G^{10}$ so that, by means of the regulator $G^{10}$, the speed of the motor can be varied gradually during the operation of the apparatus.

The receiver R, which is generally similar to the receiver B, is provided with a photo-electric cell $R^1$ disposed at the focus of the receiver reflector, this cell preferably being, like the cell $B^1$, of the gas-filled caesium type. The photo-electric cell is connected through a suitable amplifier $R^2$ and a double-pole change-over switch $R^3$ to ear-phones $R^4$.

To determine the range of a detected object the speed of the shutter $G^5$ is gradually increased so that the frequency of the fluctuations or interruptions in the beam is gradually increased from a low value to a value at which the reflected rays $E^2$ reaching the receiver are completely interrupted by the shutter $G^5$. At this frequency the time taken by the rays to travel from the projector A to the object and back to the receiver H is the same as that taken by the shutter $G^5$ to move from the position shown in Figure 7 to the position in which both the projector and the reflector are completely obscured so that the reflected rays $E^2$ are prevented from reaching the cell $R^1$. At this critical frequency of operation, the cell $H^1$ of the receive H will not be influenced by any of the reflected rays and consequently there will be no response in the ear-phones $R^4$. The correct critical speed is thus determined in a simple manner. The velocity of infra-red rays is known and as the frequency of interruption can be determined by measurement of the speed of the shutter $G^5$, it is possible for the distance of the object reflecting the rays to be accurately determined by calculation or from previously prepared tables or graphs or even automatically by means of a suitable indicator or integrator associated with the apparatus and actuated by the motor $G^8$.

The other receiver B which is similar to that employed in the arrangement shown in Figure 1 may, if desired be omitted but it is usually desirable to provide this receiver, which is not controlled by the shutter $G^5$, as it can be used for maintaining the beam trained on the distant object E.

Owing to the high velocity of infra-red rays and accordingly the high frequency of interruption necessary to obtain the critical frequency referred to above, this method of range finding is mainly suitable for objects at a considerable distance, for example five miles or more. Alternative apparatus is accordingly preferably provided as shown in Figure 6 for measuring the distance of an object from a beam when this object is at shorter distances. Such apparatus embodies a two-element oscillograph, which in the arrangement shown in Figure 6 comprises a split beam cathode ray oscillograph, capable of producing two traces superimposed on the indicating or recording surface of the oscillograph. One element of the oscillograph is controlled by means at the transmitter responsive to the fluctuations in the projected beam so that the trace produced by such element is in phase with the fluctuations in the projected beam, whilst the other element is controlled by the reflected rays reaching the receiver so that the trace produced by such second element is in phase with the fluctuations in the received rays. The phase displacement between the two superimposed traces is measured, this phase displacement being dependent upon the time taken by the rays to travel from the projector to the object and back to the receiver and therefore on the distance of the object from the apparatus.

Accordingly a photo-electric cell K mounted in a suitable reflector $K^1$ is arranged so that by means of a mirror $K^2$ a portion of the projected beam $A^2$ impinges on the cell K. The cell K is connected through suitable amplifying apparatus $K^3$ to the deflecting plates $L^1$ of a split beam cathode ray oscillograph L which is indicated diagrammatically as having two sets of electrostatic control elements respectively controlling the two beams passing through appropriate apertures in a common anode $L^2$. It is to be understood that the diagrammatic indication of this cathode ray oscillograph is used in order to indicate a construction such that two electron beams can simultaneously traverse a single luminous screen $L^3$.

By changing the switch $R^3$ to the upper position the photo-electric cell $R^1$ of the receiver R is connected through its amplifier $R^2$ to the deflecting plates $L^4$ of the cathode ray oscillograph so as to control the deflection of the lower beam. The oscillograph is also provided with two further sets of deflecting plates $L^5$ and $L^6$ respectively controlling the traversing of the two beams, these plates being connected to an amplifier M supplied with impulses having a frequency determined by the speed of the motor $G^8$, and being derived from a machine $M^1$, for example of the inductor-generator type, driven by the motor $G^8$.

The two beams thus traverse the screen $L^3$ simultaneously at a speed determined by the speed of the shutter $G^5$, the upper beam being deflected by an amount and at an instant which depends upon impulses derived from the photo-electric cell K whilst the lower beam is deflected by an amount and at an instant depending upon impulses received from the photo-electric cell $R^1$.

The oscillograph L thus reproduces two traces respectively corresponding to the fluctuating projected beam and the reflected rays, the phase displacement between these two traces being dependent upon the time taken by infra-red rays to travel from the projector A to the object E and back from the object E to the receiver H. By measurement of this phase displacement the distance of the object E can readily be calculated. The battery $D^1$ is employed to furnish suitable direct current potential for energizing the motor $G^8$ to the amplifiers $B^2$, $R^2$, $K^3$ and M.

Yet another method of employing the improved system according to this invention for range finding is to mount the projector and the receiver a short distance apart, say a few feet, and to adjust their angles relatively to one another so that the rays from the object in the beam are reflected on to the receiver. The distance of the object from the apparatus can then be calculated from the angular bearings of the projector and the receiver and the distance between them. Whilst the projector and the receiver can be spaced at any convenient distance apart when the beam consists of visible light, they must, when an infra-red or other invisible beam is used, either be sufficiently close to be mechanically connected, or they must be positively coupled by suitable control apparatus, such as servo-mechanism, which may be of the follow-up type. The mechanical or other coupling between the projector and the receiver is such that the projector and the receiver can be moved independently of one another about parallel axes but other movements thereof are effected simultaneously. If this were not the case it would be extremely difficult to adjust the receiver to the appropriate position. Preferably, as in the arrangement shown in Figure 6, this arrangement is provided with a second receiver rigidly connected to the projector so that an indication of the presence of an object in the beam can be obtained from this second receiver and then the range finding receiver can be traversed to bear on such object.

Any one of the systems described above for determining the range of a distant detected object may also be usefully employed for sounding the sea bottom, more especially at great depths although when so employed, it is not desirable to use infra-red rays as they have little penetrative power in water. Such a system may also be employed for giving warning to vessels when they are approaching their minimum draught by arranging for the beam to be projected downwardly from one point on the ship, say at the bows, while the receiver is positioned at a different point, say at the stern, and is directed along a line which intersects the beam at a relatively obtuse angle at a predetermined point below the ship's bottom which corresponds to the safe minimum depth of water for the vessel in question. If the vessel enters water of this minimum depth, the rays striking the sea bed will be deflected and picked up by the receiver which is arranged to respond and give any suitable warning signal.

The system in accordance with the invention can be used for a number of war purposes in addition to range finding, for example, of aircraft, in the manner above described. Thus, the system may be used on aircraft to control automatically the firing of a machine gun in such a manner that only when the gun is trained upon an object, such as another aircraft, is the gun released for firing. The system may also be used for automatically controlling a machine gun trained, for example, on the top of a ridge, the beam of infra-red or other rays being directed against the sky line at the top of the ridge so that if any objects appear above the ridge so as to reflect the rays back to the receiver of the system, the gun is automatically fired. In such cases the gun may be controlled by an alternating current relay such as the relay F of the arrangement shown in Figure 1 connected by a transformer to a thermionic amplifier the input grid voltage of which is controlled by the electric cell of the receiver of the reflected fluctuating rays.

Whilst, as stated above, the receiver may be arranged to control a relay for lighting a lamp or for releasing a gun, it will be appreciated that a relay or equivalent device operated by the receiver can be arranged to cause or initate any other desired operation or control function associated with the projecting or receiving apparatus or with, for example, a vehicle or ship on which such apparatus is mounted, or with other mechanism or apparatus which it is desired to control in dependence on the presence or absence of an object in the projector beam.

The invention is also applicable to arrangements for commercial use, such as the counting of articles issuing from machines, for example, newspapers from a press, where it is desirable for the device to be operated from a predetermined position and the beam is not reflected to any appreciable extent by the background behind the articles to be counted. In such cases each article as it passes the projected beam of electromagnetic rays reflects the rays to the receiver and this enables each article to be counted. Similarly the arrangement can be employed for counting moving vehicles passing, say, over the brow of a hill or individuals passing through a gate having a non-reflecting background.

It will be appreciated that whilst in many applications of the system according to the invention, an infra-red projected beam is used, any other suitable electromagnetic rays falling within the wave band defined above can be employed. Thus, although a visible light beam, if employed, renders unnecessary the use of a receiver solely for detecting the object—since this will be visible in the beam—the distance of the object from the projector can readily be determined in a simple and rapid manner by means of this improved arrangement when using visible light. Moreover, a visible light beam can be employed for other purposes, for example, for observations under water or in other media which are not readily penetrated by infra-red or ultra-violet rays. As will be appreciated the nature of the rays projected, for example, ultra-violet rays, visible light rays, or infra-red rays or combinations of such rays or parts of the wave bands covered by such waves can be selected to suit the medium concerned and other conditions under which observations are to be made.

It is to be understood that the above description is by way of example only, that various modifications may be made within the scope of the invention, and also that the improved system and apparatus may be used for purposes other than those specified above within the scope of the invention as defined in the following claims.

What I claim as my invention and desire to secure by Letters Patent of the United States is:

1. A system for detecting the presence and the position of objects, especially invisible or obscure objects, comprising in combination, means for projecting a beam of electromagnetic rays falling within the infra-red, visible and ultra-violet wave band, means for periodically interrupting such beam, a receiver for rays reflected from an object in the path of the beam, an element in the receiver electrically responsive to electromagnetic rays falling thereon, means for periodically interrupting the reflected rays falling on such element, means for detecting electrical fluctuations produced by the reflected rays falling on said element, and means for varying the periodicity of the interrupting means for both the projected beam and the reflected rays in synchronism.

2. The combination with the system claimed in claim 1, of a second receiver electrically responsive to electromagnetic waves reflected from an object in the path of the beam, and means for detecting electrical fluctuations produced by the fluctuating rays reaching the receiver whereby the projected beam can be maintained on the object when the reflected rays are prevented from reaching the first receiver by the interrupting means associated with said first receiver.

3. Apparatus for detecting the presence of objects, comprising the combination of two beam focussing systems disposed adjacent to one another, a source of radiant energy producing rays falling within the infra-red, visible and ultra-violet wave bands substantially at the focus of one system so that the system projects a beam of such rays on to an object to be detected, an element electrically responsive to the said rays substantially at the focus of the other system, means for mounting and connecting the two beam focussing systems so that the projected beam from the first system can be maintained on the said object and the second focussing system is directed along the said beam so that radiant energy reflected from the object back towards the focussing systems will be focussed on the responsive element in the second focussing system, means for causing fluctuations at a frequency not below an audible frequency in the radiant energy reaching the responsive element, and means responsive to the frequency of the fluctuations associated with the said element for detecting electrical variations produced in the element due to the fluctuations in the radiant energy falling thereon.

4. A system for detecting the presence and the position of objects, especially invisible or obscure objects, comprising, in combination, means for projecting a beam of electromagnetic rays falling within the infra-red, visible and ultra-violet wave band, means for producing periodic fluctuations in such beam, a receiver electrically responsive to rays reflected from an object in the path of the beam, means associated with the projector and responsive to fluctuations in the beam, a two-element oscillograph having one element thereof connected to the said means so as to produce a trace in synchronism with the fluctuations in the beam, means associated with the receiver and responsive to fluctuations in the received rays, and connections between the said receiver means and the second element of the oscillograph whereby such second element produces a trace in synchronism with the fluctuating reflected rays reaching the receiver.

5. A system for detecting the presence and the position of objects, especially invisible or obscure objects, comprising, in combination, means for projecting a beam of infra-red rays, means for periodically interrupting such beam, a photo-electric cell operable in conjunction with the projecting means that the said cell is influenced by the interrupted beam, a receiver for rays reflected from an object in the path of the beam, a photo-electric cell in the receiver responsive to infra-red rays falling thereon, a two-element oscillagraph, having one element thereof connected to the first said photo-electric cell so as to produce electrical variations in the said photo-electric cell, and circuit connections between the photo-electric cell in the receiver and the second element of the oscillograph whereby said second element reproduces electrical variations in the photo-electric cell of the receiver.

6. Apparatus for detecting the presence and the position of objects, comprising the combination of a projector for projecting on to an object to be detected a beam of electro-magnetic rays falling within the infra-red, visible and ultra-violet wave band, means associated with the projector for periodically interrupting the said beam, a photo-electric cell associated with the projector so as to be exposed to the periodically interrupted projected beam, a receiver for rays reflected from the said object in the beam, a photo-electric cell in the receiver responsive to the said reflected rays, a split beam cathode ray oscillograph having a single screen, two electron beams capable of simultaneously traversing the said screen and two control elements for respectively and independently controlling the two electron beams, the photo-electric cell associated with the projector and the control element of one electron beam being operatively connected so that the said electron beam traverses the screen in synchronism with the interruptions in the projected beam, and circuit connections between the photo-electric cell in the receiver and the control element of the second electron beam whereby such second electron beam traverses the screen in synchronism with the interruptions in the reflected rays.

7. A system for detecting the presence and the position of objects, especially invisible or obscure objects, comprising, in combination, means for projecting a beam of electromagnetic rays falling within the infra-red, visible and ultra-violet wave band, means for producing periodic fluctuations operatively associated with the projector, a reflected ray receiver for receiving rays from an object in the path of the beam, means electrically responsive to fluctuations in the reflected rays operatively associated with the receiver and an electro-optical means operatively connected electrically with the beam responsive means and with the reflected ray responsive means whereby to produce concurrently traces respectively, in synchronism with the fluctuations in the beam and the fluctuations in the reflected rays, displaced in phase relation an amount corresponding to the distance between the projector and the object from which the reflected rays emanate.

ERIC GEORGE HERBERT MOBSBY.